(12) United States Patent
Thiesson et al.

(10) Patent No.: US 7,184,591 B2
(45) Date of Patent: Feb. 27, 2007

(54) SYSTEMS AND METHODS FOR ADAPTIVE HANDWRITING RECOGNITION

(75) Inventors: Bo Thiesson, Woodinville, WA (US); Christopher A. Meek, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 649 days.

(21) Appl. No.: 10/442,547

(22) Filed: May 21, 2003

(65) Prior Publication Data

US 2004/0234128 A1 Nov. 25, 2004

(51) Int. Cl.
G06K 9/18 (2006.01)
(52) U.S. Cl. .................................... 382/186; 382/224
(58) Field of Classification Search ................ 382/227
See application file for complete search history.

(56) References Cited

U.S. PATENT DOCUMENTS

| | | | |
|---|---|---|---|
| 5,497,339 A * | 3/1996 | Bernard | 708/109 |
| 5,577,135 A | 11/1996 | Chow et al. | |
| 5,854,855 A | 12/1998 | Murdock et al. | |
| 6,205,261 B1 * | 3/2001 | Goldberg | 382/310 |

OTHER PUBLICATIONS

C.J. Leggetter and P.C. Woodland, "Speaker Adaptation of HMMS Using Linear Regression",Cambridge Unibersity Engineering Department, Jun. 1994, 21 pages.
M.J.F. Gales and P.C. Woodland, "Mean and Variance Adaptation within the MLLR Framework", Cambridge University Engineering Department, Aprip 1996, 26 pages.
B. Neubuser; European Search Report; The Hague, The Netherlands; Aug. 20, 2004.
E.J. Leggetter, et al.; Speaker Adaptation of Continuous Density HMMS Using Multivariate Linear Regression; ICSLP 94: 1994 International Conference on Spoken Language Processing. Yokohama, Japan, Sep. 18-22, 1994, International Conference on Spoken Language Processing (ICSLP), Yokohama : ASJ, JP, vol. 2, Sep. 18, 1994, pp. 451-454.
M.J.F. Gales, et al.; Mean and variance adaptation within the MLLR framework; Computer Speech and Language, Academic Press, London, GB, vol. 10, No. 4, Oct. 1996, pp. 249-264.
L. Duneau, et al.; On-line cursive script recognition: a system that adapts to an unknown user; Pattern Recognition, 1994. vol. 2—Conference B: Computer Visiona nd Image Processing, Proceedings of the 12th IAPR International Conference on Jerusalem, Israel Oct. 9-13, 1994; Los Alamitos, CA; IEEE Comput. Soc., Oct. 9, 1994, pp. 24-28.
Learning Method for On-Line Character Recognizers Based on User's Heuristic Data; IBM Technical Disclosure Bulletin, IBM Corp., New York, vol. 38, No. 7, Jul. 1, 1995, pp. 419-420.
E. Bellegarda, et al.; A Fast Statistical Mixture Algorithm for On-Line Handwriting Recognition; IEEE Transactions on Pattern Analysis and Machine Intelligence, IEEE, Inc.; New York; vol. 16, No. 12; Dec. 1, 1994; pp. 1227-1223.

* cited by examiner

*Primary Examiner*—Joseph Mancuso
*Assistant Examiner*—Alex Liew
(74) *Attorney, Agent, or Firm*—Amin, Turocy, & Calvin, LLP

(57) ABSTRACT

The present invention utilizes generic and user-specific features of handwriting samples to provide adaptive handwriting recognition with a minimum level of user-specific enrollment data. By allowing generic and user-specific classifiers to facilitate in a recognition process, the features of a specific user's handwriting can be exploited to quickly ascertain characteristics of handwriting characters not yet entered by the user. Thus, new characters can be recognized without requiring a user to first enter that character as enrollment or "training" data. In one instance of the present invention, processing of generic features is accomplished by a generic classifier trained on multiple users. In another instance of the present invention, a user-specific classifier is employed to modify a generic classifier's classification as required to provide user-specific handwriting recognition.

32 Claims, 15 Drawing Sheets

SYSTEMS AND METHODS FOR ADAPTIVE HANDWRITING RECOGNITION

TECHNICAL FIELD

The present invention relates generally to handwriting recognition and more particularly to systems and methods for adaptive handwriting recognition utilizing generic and user-specific classifiers.

BACKGROUND OF THE INVENTION

Computers have become an integral part of society—every day people become more dependent on this technology to facilitate both work and also leisure activities. A significant drawback to such technology is its "digital" nature as compared to the "analog" world in which it functions. Computing technology operates in a digital domain that requires discrete states to be identified in order for information to be processed. In simple terms, information must be input into a computing system with a series of "on" and "off" states. However, humans live in a distinctly analog world where occurrences are never completely black or white, but always seem to be in between or shades of gray. Thus, a main difference between digital and analog is that digital requires discrete states that are disjunct over time (e.g., distinct levels) while analog is continuous over time. Since humans naturally operate in an analog fashion, computing technology has evolved to reduce the impact it has when interfacing with "nondigital entities" or humans.

A set of structured keys is one of the earliest human-machine interface devices, traditionally utilized in a typewriter. This interface system was adapted to interact, not with mechanical keys and paper, but to trigger discrete states that would be transmitted to a computing system. Thus, a computer "keyboard" was developed, allowing humans to utilize an existing, familiar interface with unfamiliar technology. This eased the transition into the computer age. Unfortunately, not everyone who wanted to utilize a computer knew how to type. This limited the number of computer users who could adequately utilize the computing technology. One solution was to introduce a graphical user interface that allowed a user to select pictures from a computing monitor to make the computer do a task. Thus, control of the computing system was typically achieved with a pointing and selecting device known as a "mouse." This permitted a greater number of people to utilize computing technology without having to learn to use a keyboard. Although, these types of devices made employing computing technology easier, it still did not address mankind's age old method of communicating—handwriting.

Technology first focused on attempting to input existing typewritten or typeset information into computers. Scanners or optical imagers were used, at first, to "digitize" pictures (e.g., input images into a computing system). Once images could be digitized into a computing system, it followed that printed or typeset material should be able to be digitized also. However, an image of a scanned text page cannot be manipulated as text after it is brought into a computing system. The characters and words are "pictures" and not actually editable text. Thus, optical character recognition (OCR) technology was developed to utilize scanning technology to digitize text as an editable page. This technology worked reasonably well if a particular text font was utilized that allowed the OCR software to translate a scanned image into editable text. At first, this technology had an accuracy of about 50 to 60%, but today it has progressed to an accuracy of near 98 to 99% or higher. OCR technology has even evolved to the point where it can take into account not only recognizing a text character, but also retaining paragraph and page formatting and even font characteristics.

Subsequently, OCR technology reached an accuracy level where it seemed practical to attempt to utilize it to recognize handwriting. After all, why transpose handwriting to text via a keyboard if it can be directly digitized into a computing system? The problem with this approach is that existing OCR technology was tuned to recognize limited or finite choices of possible types of fonts. Thus, it could "recognize" a character by comparing it to a database of pre-existing fonts. If a font was a incoherent, the OCR technology would return strange or "non-existing" characters, indicating that it did not recognize the text. Handwriting proved to be an even more extreme case of this problem. When a person writes, their own particular style shows through in their penmanship. Signatures are used, due to this uniqueness, in legal documents because they distinguish a person from everyone else. Thus, by its very nature, handwriting has infinite forms even for the same character. Obviously, storing every conceivable form of handwriting for a particular character would prove impossible. Other means needed to be achieved to make handwriting recognition a reality.

One of the earlier attempts at handwriting recognition involved "handwriting" that was actually not handwriting at all. A system of "strokes" or lines was utilized as input into a computing system via a "tablet" or writing surface that could be digitized and translated into the system. Although, attempts were made to make the strokes very symbolic of a printed text letter, the computing system was not actually recognizing handwriting. In fact, this method actually forces humans to adapt to a machine or system being used. Further developments were made to actually recognize true handwriting. Again, if a system was required to match every conceivable variation of a letter to one in a given database, it would take enormous processing resources and time. Therefore, some of the first advances were made in areas that had at least a finite, even though rather large, group of possibilities. The resulting technology proved invaluable for operations such as sorting mail. In this case, an attempt can be made to optically recognize for instance, a city name. Should a computing system fail to "comprehend" the name, it can utilize "context" such as what state a piece of mail is from and if the system recognize at least some of the characters in the city name. This allows a search to proceed in a database of a state's city names, often resolving the discrepancy and resulting in a higher yield of "readable" addresses.

Of course, the introduction in the United States of postal zip codes minimizes the OCR technology's importance for reading name addresses. Thus, the technology can concentrate mainly on recognizing only numbers and not letters. This limits the necessary translation to only 10 characters (0 through 9). However, depending upon location, schooling, and other factors, people learn to write numbers differently. The most common varying numbers are "2's" and "4's." People often write 2's with or without a loop and write 4's either closed or open on top. These variations of the same character are taken into account by the handwriting technology, so that different variations of the same character are interpreted by the computing system as the same character. This works fairly efficiently due to the limited number of characters and, therefore, the limited number of allowed variations.

One can appreciate that recognizing numbers is a step in the right direction. But, most computing system users would like to have the system directly recognize all of the characters in the alphabet as well as special characters such as '#', '$', etc.; and not just numbers. People prefer to force machines to learn from them rather than adapting to how the machine works. Thus, "learning" computing systems have evolved to facilitate in this area of human-machine interfaces. Handwriting recognition has been taken to more advanced levels by technology that allows a computing system to absorb a unique user's writing style. In this context, methods are employed to accurately interpret and exploit what a user inputs over a period of time. In order to speed up the learning process, often a technology will require structured user input or "enrollment" information to increase the technology's performance. A typical enrollment might require a user to write numbers, characters, special characters, and certain paragraphs to tune the computing system for recognition. Currently, this can be a quite lengthy process, and it is not uncommon for the process to take a substantial amount of time before high accuracy can be achieved.

Although training handwriting recognition technology can seem laborious, the benefits of having this capability over traditional computing system interfaces are tremendous. Currently, the most efficient means for multiple users to input information into a system is via the keyboard. This is due to the fact that the keyboard is typically universal in design, and therefore, always a standardized interface, easily employable by many different users. However, ergonomics (e.g., human comfort with using a device) for a keyboard require that the keys be spaced a particular distance. This drives a certain minimum size for the entire keyboard, making it inconvenient for portable use. While handheld computing devices and the like are small and pocket friendly, data entry for these types of devices utilizing cryptic stroke recognition and/or tapping techniques tends to make these devices tedious to use. Once again, users are forced to learn a machine rather than the machine learning the user. Some manufacturers have attempted to produce smaller more compact keyboards to overcome this deficiency, but these "advances" have proved inconvenient for users because the resulting devices are either cumbersome and/or non-ergonomic. Portable and non-portable computing devices prove most valuable when users are able to directly input information via ordinary handwriting. This allows these devices to be utilized by skilled and unskilled users alike.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to handwriting recognition and more particularly to systems and methods for adaptive handwriting recognition utilizing generic and user-specific classifiers. Generic and user-specific features of handwriting samples are leveraged via an adaptive handwriting system to provide user-specific handwriting recognition with a minimum level of user-specific enrollment data. By allowing generic and user-specific classifiers to facilitate the recognition process, the features of a specific user's handwriting can be extracted from a few sample characters and exploited to quickly ascertain characteristics of handwriting characters not yet entered by the user. This allows the adaptive handwriting system to adapt to some characters without requiring a user to first enter examples of those characters as enrollment or "training" data. Since a reduced set of enrollment data can be utilized, the enrollment period is substantially reduced by employing the present invention, while, at the same time, maintaining a high accuracy during the handwriting recognition processing. The present invention accomplishes this by recognizing features of a handwriting sample in terms of generic features and user-specific features. It allows processing of the generic features by the generic classifier and further classifies the user-specific features via one or more user-specific classifiers. Characters that exhibit substantially similar user-specific features for a particular classifier are grouped into "tying sets. Thus, features can be extrapolated to other characters within a tying set without requiring a user to enter all characters of that particular tying set, permitting substantially reduced enrollment periods to train the present invention's classifiers, reducing user effort and time in training handwriting recognition classifiers while still maintaining recognition accuracy.

The present invention also facilitates handwriting recognition by allowing generic and user-specific classifiers to interact. This permits different granularities to be achieved with regard to handwriting samples. Thus, if the generic classifier can easily discern a feature, it is promptly identified. However, data that can be ambiguous or "confusing" is processed via a "confusion rule" which utilizes user-specific post-processor techniques to classify a character that falls within a particular confusion rule. Different types of post-processor classifications can be utilized within the present invention, for example, MLLR (Maximum Likelihood Linear Regression) adapted density models, direct density models, and direct discriminative models and the like. This flexibility to use different models and classifiers allows the present invention to readily integrate with existing handwriting recognition techniques. Thus, the present invention can utilize a generic classifier based upon collective observations from multiple users and/or a user-specific classifier that has been adapted from a generic classifier by other means than the user-specific classifiers in the present invention in order to enhance a handwriting recognition system's ability to identify data from a specific user.

The present invention also greatly enhances portable software products such as Microsoft's Windows XP® Tablet PC. Tablet PC offers the simplicity of pen and paper by enabling a user to utilize a display just like a writing tablet, inputting information in their own handwriting. It is then easily converted into text for utilization in components such as software applications like word processors, spreadsheets, and email for example. With a digital recognition system such as that provided by the present invention, a user can also mark up existing documents imported into handwriting recognition-compatible software programs. The present invention quickly interprets and adapts a user's handwriting into a form recognized by products like Tablet PC. Without the present invention, the handwriting interpretation would take substantially longer to process and with less accuracy. Thus, portable products can increase their utility by employing an instance of the present invention.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
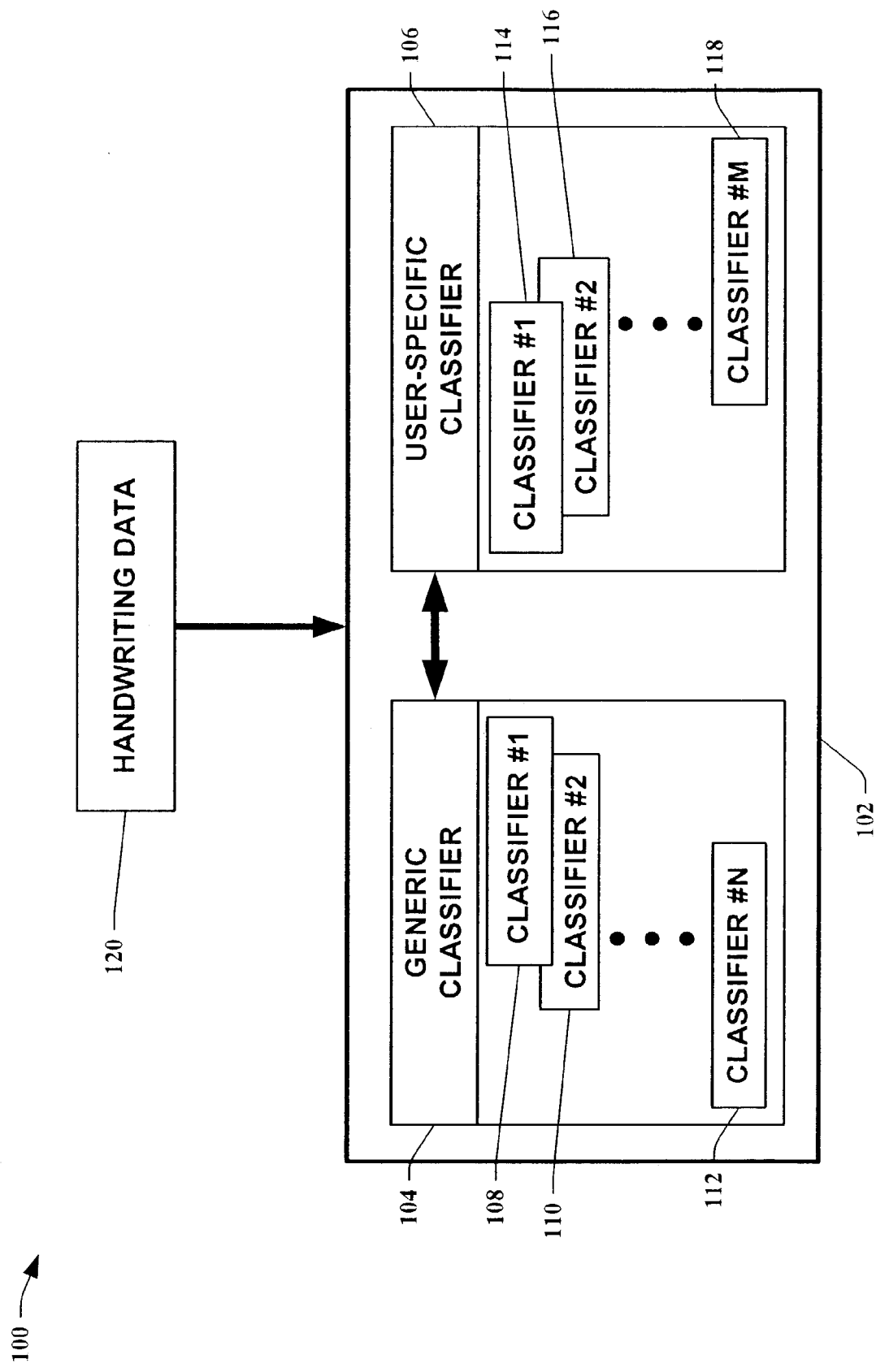
FIG. 1 is a block diagram of a handwriting recognition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention includes systems and methods that enable adaptation of a general classification model to a specific user in order to improve classification accuracy for that user. A very short enrollment period (only a few examples are needed) and fast adaptation are characteristics of the present invention. For a classifier that has been adapted to a user by the present invention, a classification is based on a combination of first a classification model that is generic (for all users), and second, a set of small classification models that act as a post-processors. The post-processor models are user-specific and therefore either adapted and/or directly learned from enrollment data. These models or "two-way" classifiers act on different sets of features as described infra. Notice that in this setup a user-specific classifier that has been adapted from a generic classifier by other means than the user-specific classifiers in the present invention may be used instead of the generic recognizer and will, for purpose of simplicity of presentation, (semantically incorrectly) be referred to as a generic classifier in the following Often, a feature vector can be separated into a part with generic features and one or more parts of user-specific features. Typically, one chooses a feature to be a generic feature if the observed values are substantially similar across all users and chooses a feature as a user-specific feature if the observed values are substantially different across all users, but are substantially similar for a particular user. For single character handwriting recognition, a generic part of a feature vector can, for instance, consist of scaled shape relevant features and a user specific part could then consist of size and position features. As an example, scaled observations for a particular character can appear substantially similar across many users, whereas size and position of individual characters (without scaling) can account for a substantial part of the personalization of handwriting to a specific user.

In general, one instance of the present invention is comprised of three aspects. The first aspect is a generic classification model or "classifier" that is trained on observations from multiple users. Features utilized for this model can be generic features only, or it can be generic and user-specific features. The second aspect includes multiple enrollment classification models, which are either first trained on observations from multiple users and later adapted to a specific user from observations obtained through a short enrollment of that user, or they are trained directly on the obtained enrollment data. The features used in these models are the user-specific features only. The third aspect is a system and/or method for combining the generic and user-specific enrollment classification models or classifiers.

In FIG. 1, a block diagram of a handwriting recognition system 100 in accordance with an aspect of the present invention is illustrated. The handwriting recognition system 100 is comprised of a recognition component 102 having at least one generic classifier component 104 and/or at least one user-specific classifier component 106. In this instance of the present invention, the generic classifier component 104 is comprised of generic classifiers #1–N 108–112, where N represents any integer from one to infinity. The user-specific classifier component 106 is comprised of user-specific classifiers #1–M 114–118, where M represents any integer from one to infinity. The recognition component 102 receives and analyzes handwriting data 120. The generic classifier component 104 and the user-specific classifier component 106 can be utilized in conjunction to facilitate analysis by the recognition component 102. In one instance of the present invention, the generic classifier component 104 is utilized to provide classification of handwriting data that is substantially similar across users, and the user-specific classifier component 106 is employed to facilitate in determining the classification of user-specific data.

Figure 2:
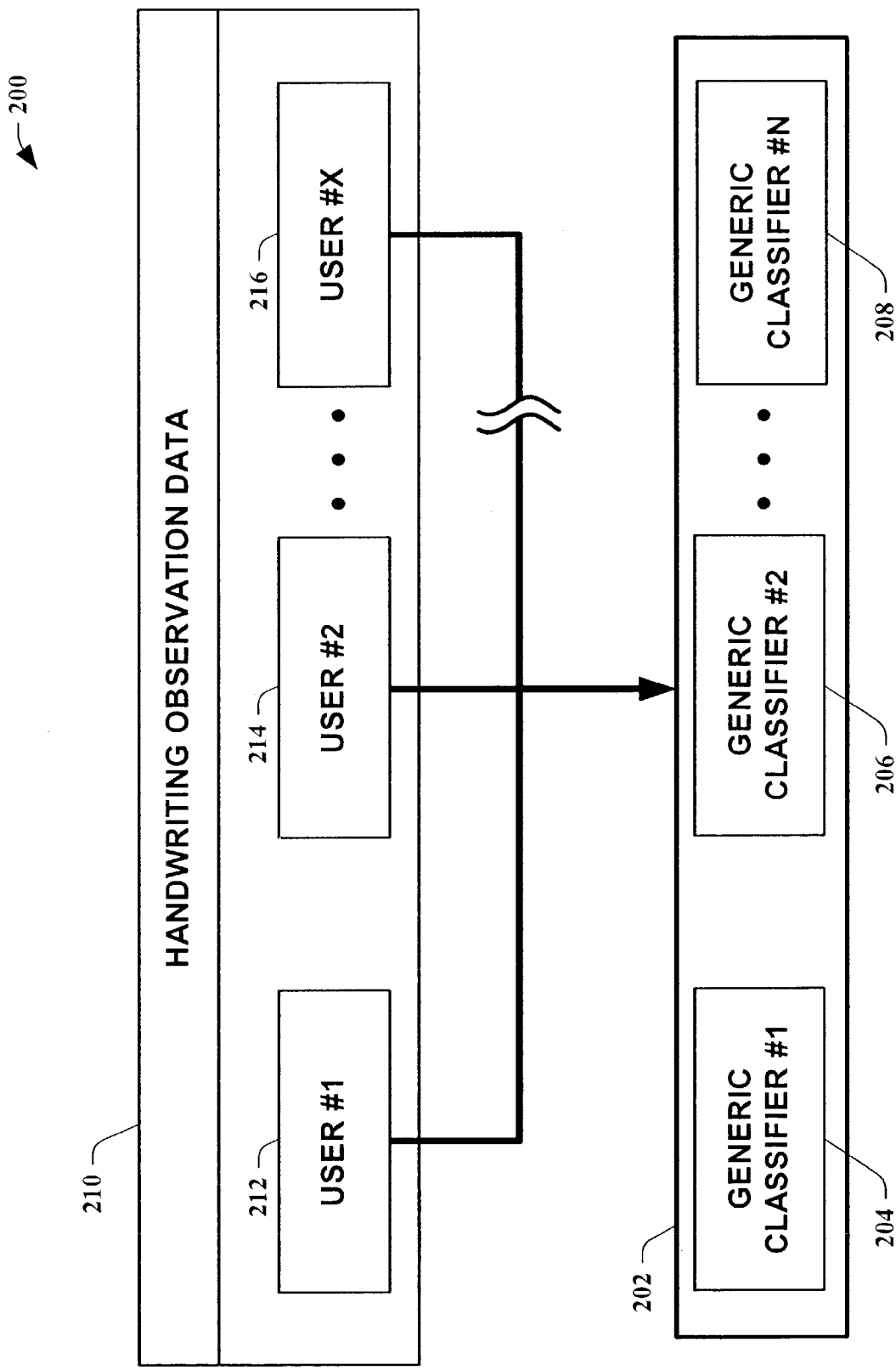
FIG. 2 is a block diagram of a handwriting observation process in accordance with an aspect of the present invention.

In order for the present invention to efficiently analyze handwriting, it is "trained" or taught from various data sources to recognize handwriting aspects. Looking at FIG. 2, a block diagram of a handwriting observation process 200 in accordance with an aspect of the present invention is shown. In this instance of the present invention, the handwriting observation process 200 is comprised of a generic classifier component 202 having generic classifiers #1–N 204–208, where N represents any integer from one to infinity and handwriting observation data 210 containing data from multiple users #1–X 212–216, where X represents any integer from one to infinity. In this process 200, the generic classifier component 202 trains its classifiers 204–208 on the data 210 from the multiple users 212–216. The observations utilized for training the generic classifier component 202 can be comprised of generic features and/or user-specific features.

Figure 3:
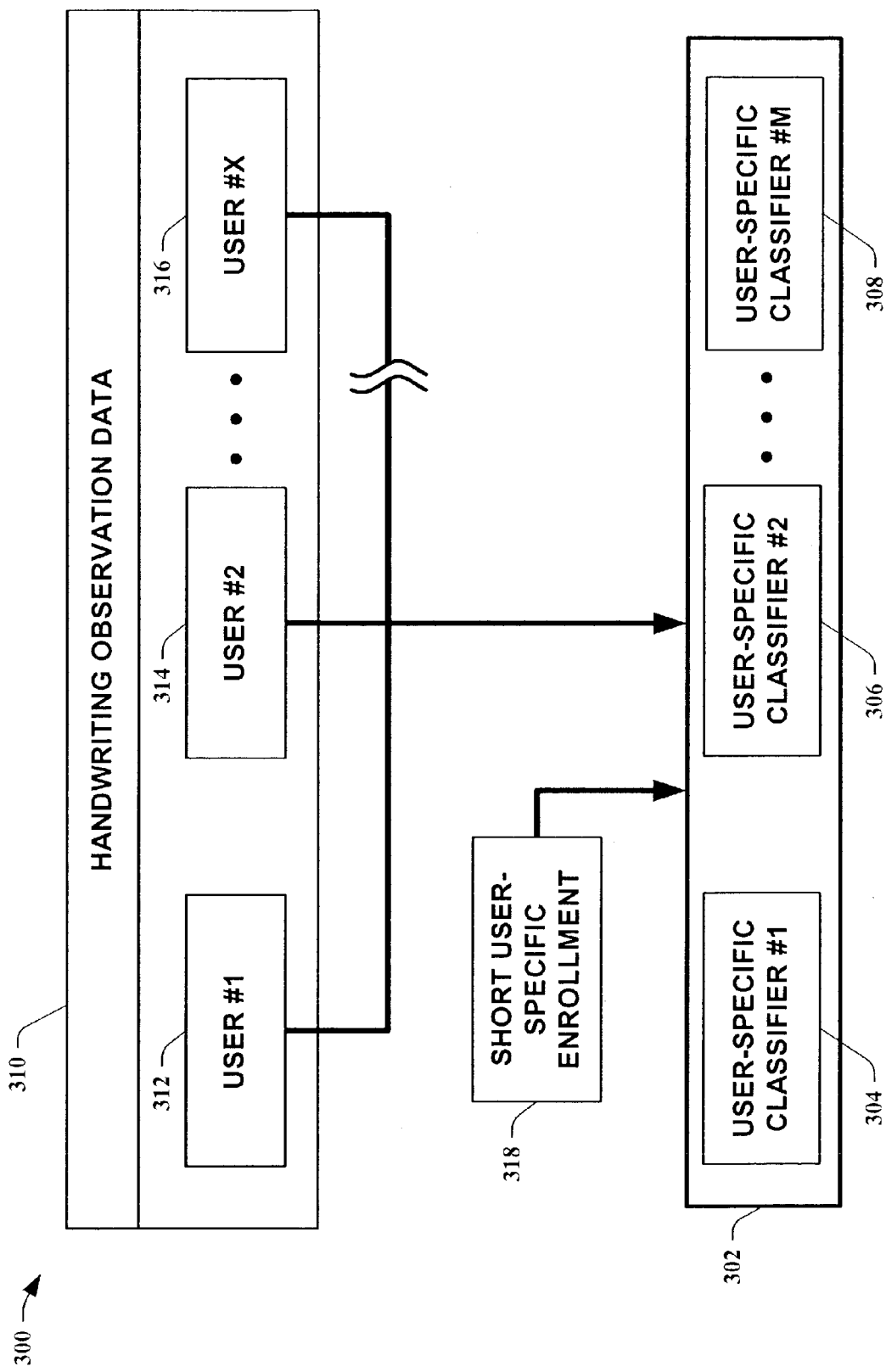
FIG. 3 is another block diagram of a handwriting observation process in accordance with an aspect of the present invention.

Turning to FIG. 3, another block diagram of a handwriting observation process 300 in accordance with an aspect of the present invention is depicted. In this instance of the present invention, the handwriting observation process 300 is comprised of a user-specific classifier component 302 having user-specific classifiers #1–M 304–308, where M represents any integer from one to infinity; handwriting observation data 310 containing data from multiple users #1–X 312–316, where X represents any integer from one to infinity; and user-specific enrollment data 318. In this process 300, the user-specific classifier component 302 trains its classifiers 304–308 on the data 310 from the multiple users 312–316 and then adapts its classifiers 304–308 based on the user-specific enrollment data 318. The observations utilized for training the user-specific classifier component 302 is comprised of user-specific features only.

Figure 4:
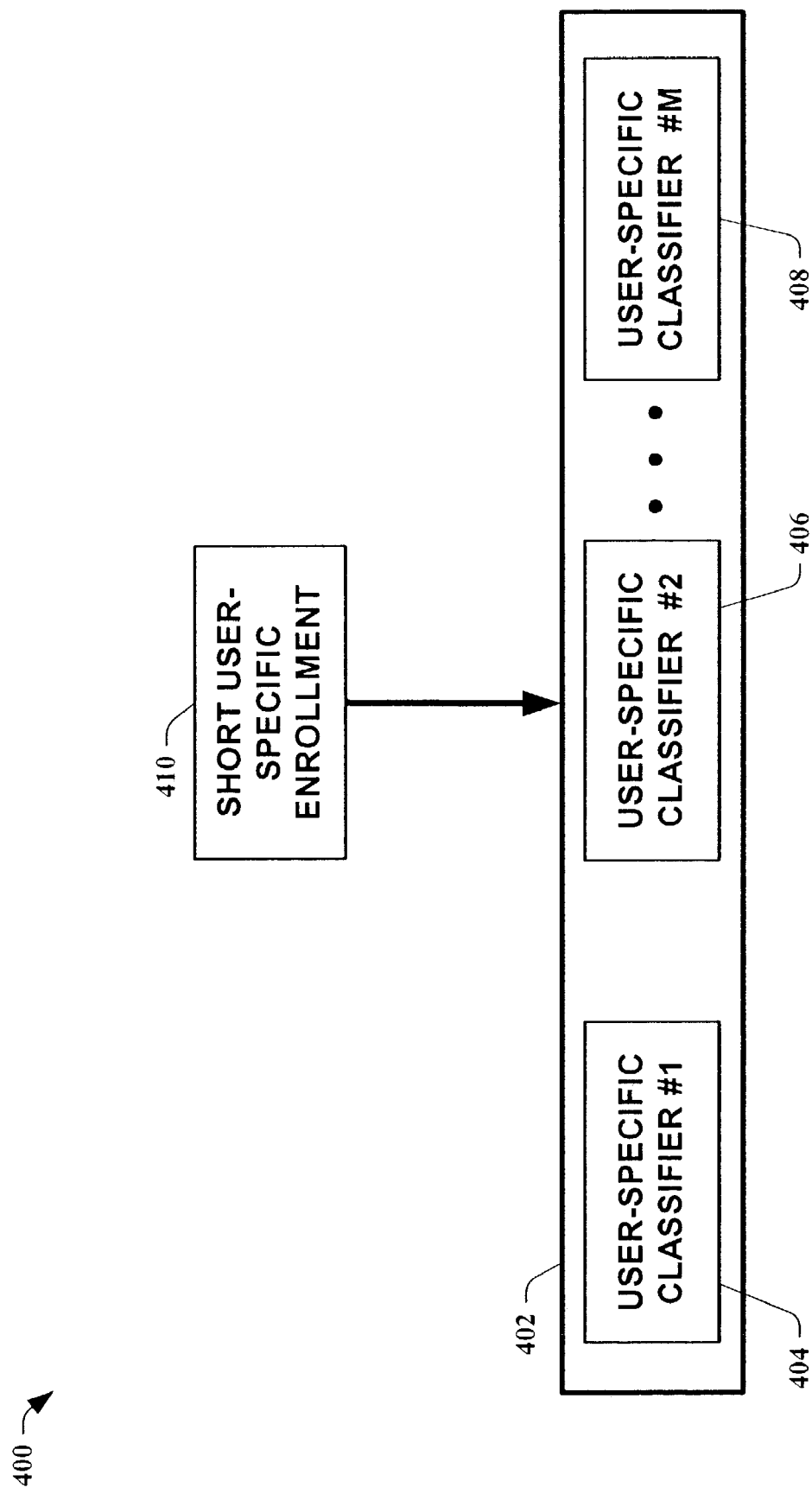
FIG. 4 is yet another block diagram of a handwriting observation process in accordance with an aspect of the present invention.

Referring to FIG. 4, yet another block diagram of a handwriting observation process 400 in accordance with an aspect of the present invention is shown. In this instance of the present invention, the handwriting observation process 400 is comprised of a user-specific classifier component 402 having user-specific classifiers #1–M 404–408, where M represents any integer from one to infinity and user-specific enrollment data 410. In this process 400, the user-specific classifier component 402 trains its classifiers 404–408 on the user-specific enrollment data 410 and then adapts its classifiers 404–408 based on the user-specific enrollment data 410. The observations utilized for training the user-specific classifier component 402 is comprised of user-specific features only.

Figure 5:
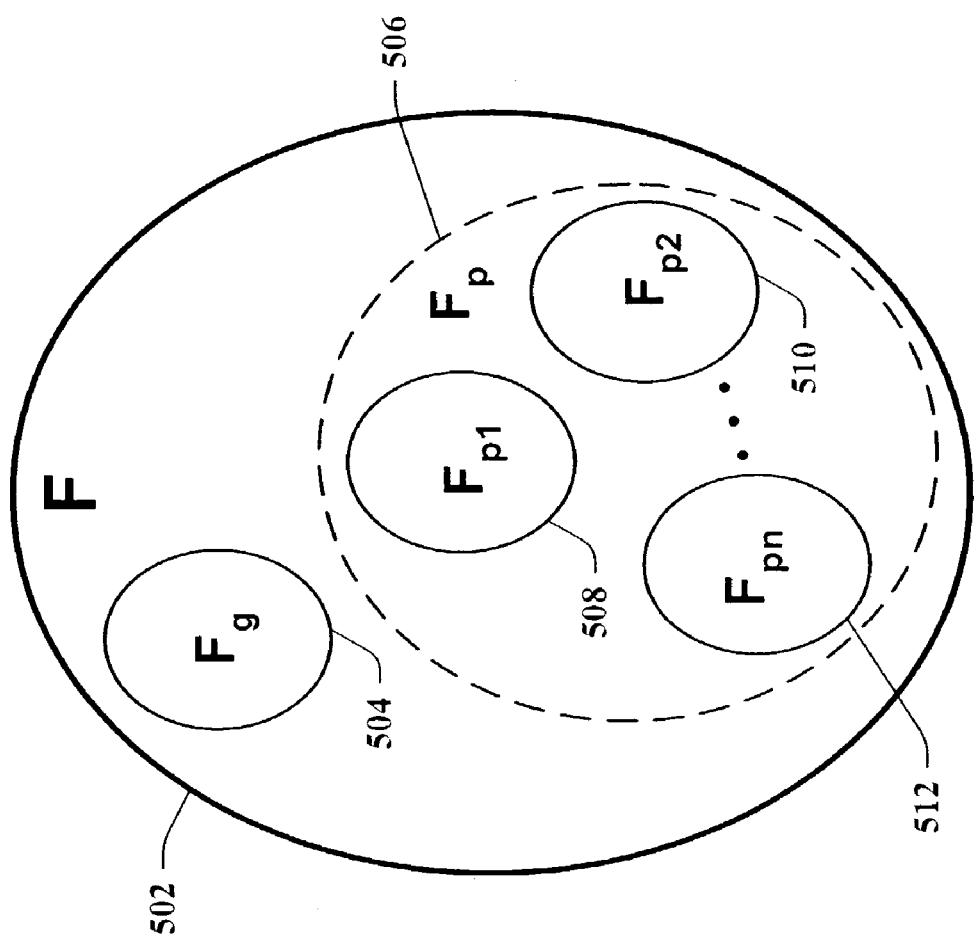
FIG. 5 is a diagram of a feature set in accordance with an aspect of the present invention.

Turning to FIG. 5, a diagram of a feature set 502 in accordance with an aspect of the present invention is shown. To further illustrate the concept of a feature set having generic and user-specific aspects, the feature set 502 is comprised of generic features, $F_g$, 504, where subscript 'g' indicates any generic features; and user-specific features, $F_p$, 506, where subscript 'p' indicates any user-specific (or personal) features. The user-specific features 506 are comprised of sub-features, $F_{p1}$–$F_{pn}$, 508–512. Formally, the full feature set $F=F_g \cup F_{p1} \cup F_{p2} \cup \ldots \cup F_{pn}$, where $F_g$ are the generic features and $F_{pi}$, i=1, . . . , n are subsets of the user-specific features.

Figure 6:
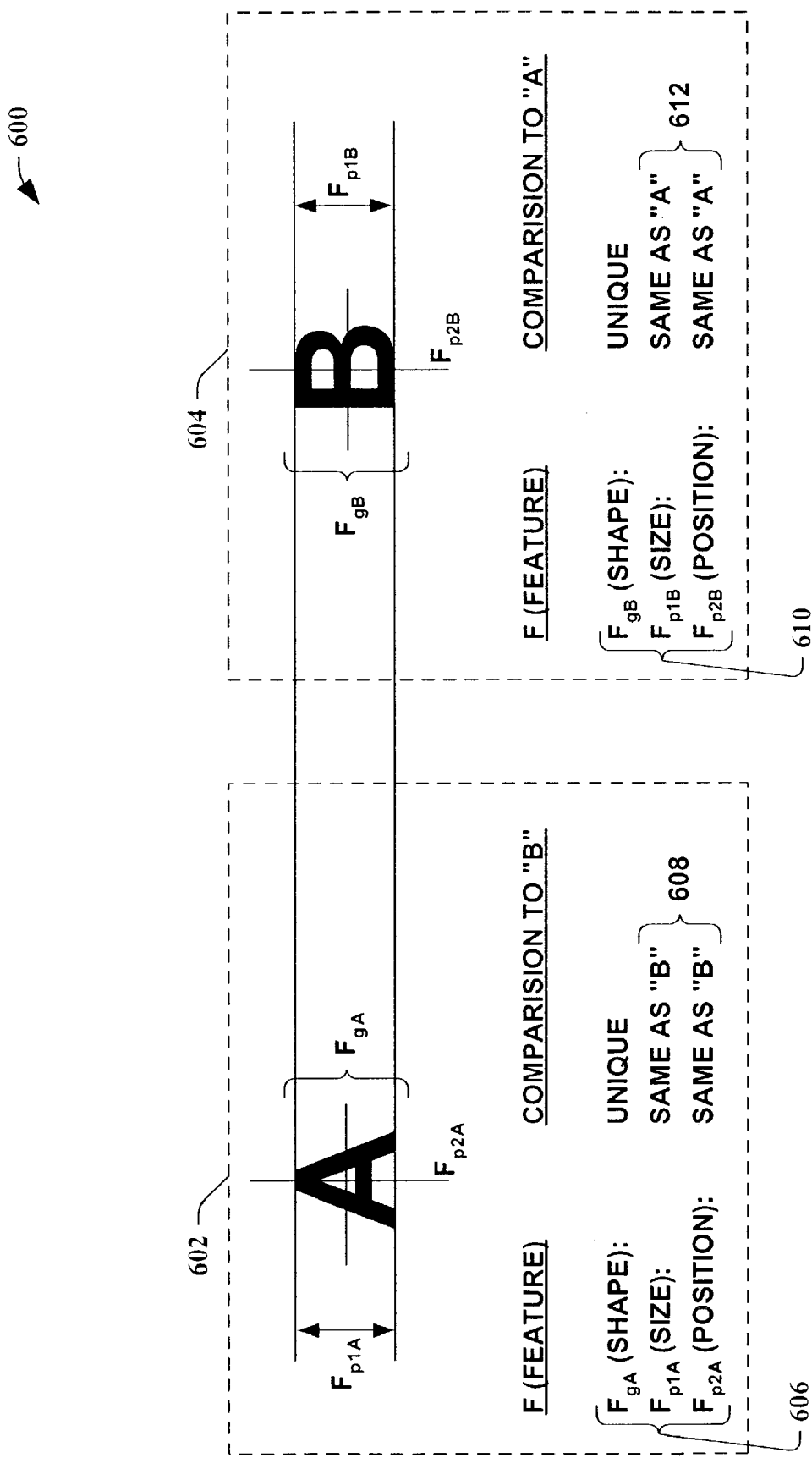
FIG. 6 is a diagram of handwriting character features in accordance with an aspect of the present invention.

This concept is further illustrated in FIG. 6 where a diagram of handwriting character features 600 in accordance with an aspect of the present invention is depicted. In this figure, a character "A" 602 is generically and user-specifically cross analyzed to a character "B" 604. In this example, three sub-features 606, 610 are analyzed, namely shape, size, and position of a character. A comparison is then made between the "A" and "B" to determine if any of the sub-features 606, 610 are "common" or generic between the characters. $F_{gA}$ represents the shape of the "A," and it is compared to $F_{gB}$ which represents the shape of the "B." In this illustration, shape is considered a generic feature and is unique between the "A" and the "B." Thus, a generic classifier for the shape sub-feature can easily discern between an "A" and a "B" in this example. For these illustrative purposes, sub-features size and position are considered to be user-specific features. When size and position are compared between the characters, they are substantially the same. Therefore, the user-specific sub-features 608 of "A" can be construed to also substantially represent those sub-features 612 of "B." Thus, the user-specific classifier only needs to have one of the characters enrolled in order to recognize these features of the other character, reducing the amount of user-specific enrollment data required for recognizing that character.

Short user enrollment is contingent on many characters/classes being substantially similar with respect to chosen user-specific features, but, at the same time, being substantially distinguishable for generic features. For instance, for the handwriting example above, the "A" and the "B" are substantially distinguishable when considered via the generic shape sub-features, but look substantially the same when only size and position are considered. When learning adaptable user-specific models, an observation on "A" is therefore as good as an observation on "B," and, hence, fewer observations are required to cover all characters. This concept is denoted as "tying" and classes/characters that are tied together are denoted as a "tying set." Frequently, it is desirable to break user-specific features into multiple sets of features. Different subsets or sub-features of these features behave differently. For example, an "f" and a "g" may look substantially the same with respect to only size features, but are substantially different with respect to position features.

Figure 7:
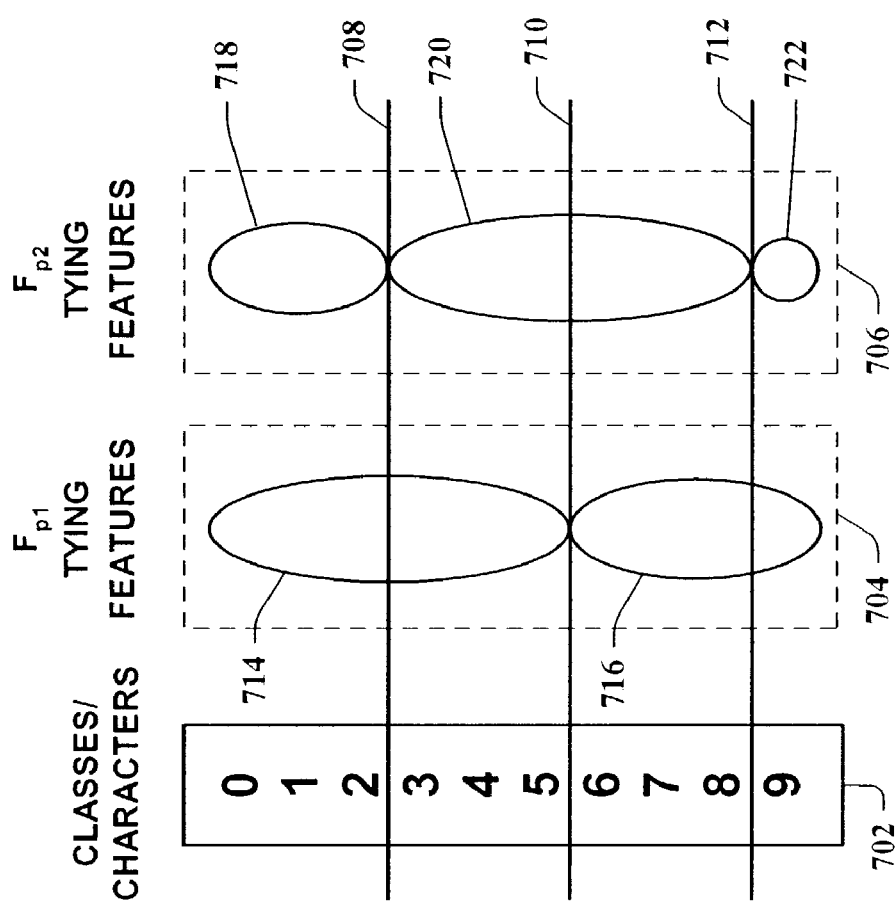
FIG. 7 is a diagram of tying sets in accordance with an aspect of the present invention.

Different subsets of user-specific features can result in different tying sets for classes/characters under consideration, as illustrated in FIG. 7. In this figure, a diagram 700 of tying sets in accordance with an aspect of the present invention is shown. The diagram 700 consists of classes/characters column 702, $F_{p1}$ tying features class 704, and $F_{p2}$ tying features class 706. The diagram 700 illustrates relationships between user-specific sub-features $F_{p1}$ and $F_{p2}$ relative to various classes/characters. The classes/characters are represented as numbers 0–9, but can be letters and the like. From the diagram 700, it can be seen that the $F_{p1}$ tying feature class 704 is comprised of first and second $F_{p1}$ tying sets 714, 716. The first $F_{p1}$ tying set 714 links classes/characters 0–5 together for an aspect of user-specific sub-features represented by $F_{p1}$. The second $F_{p1}$ tying set 716 links classes/characters 6–9 together for another aspect of the user-specific sub-features represented by $F_{p1}$. This permits a more limited enrollment requirement for this sub-feature for a specific user. Thus, the specific user needs to only provide $F_{p1}$ sub-feature enrollment data for only one class/character in a particular tying set. Likewise, the $F_{p2}$ tying features class 706 is comprised of first, second and third $F_{p2}$ tying sets 718–722. The first $F_{p2}$ tying set 718 links classes/characters 0–2 together for an aspect of user specific sub-features represented by $F_{p2}$. The second $F_{p2}$ tying set 720 links classes/characters 3–8 together for another aspect of these same sub-features. The third $F_{p2}$ tying set 722 includes only class/character 9. Although only two sub-feature classes are illustrated, any number of sub-feature classes is possible with the present invention. Similarly, the number of tying sets in each class can be greater or less than that illustrated. It is possible for a class to even have only a single tying set. Lines 708–712 represent finest grained partitions of classes/characters according to the tying sets in $F_{p1}$ and $F_{p2}$. Thus, line 710 represents a partition caused by the $F_{p1}$ class, while lines 708 and 712 represent the partitions caused by the $F_{p2}$ class. These are utilized for some small post-processors discussed infra.

Figure 8:
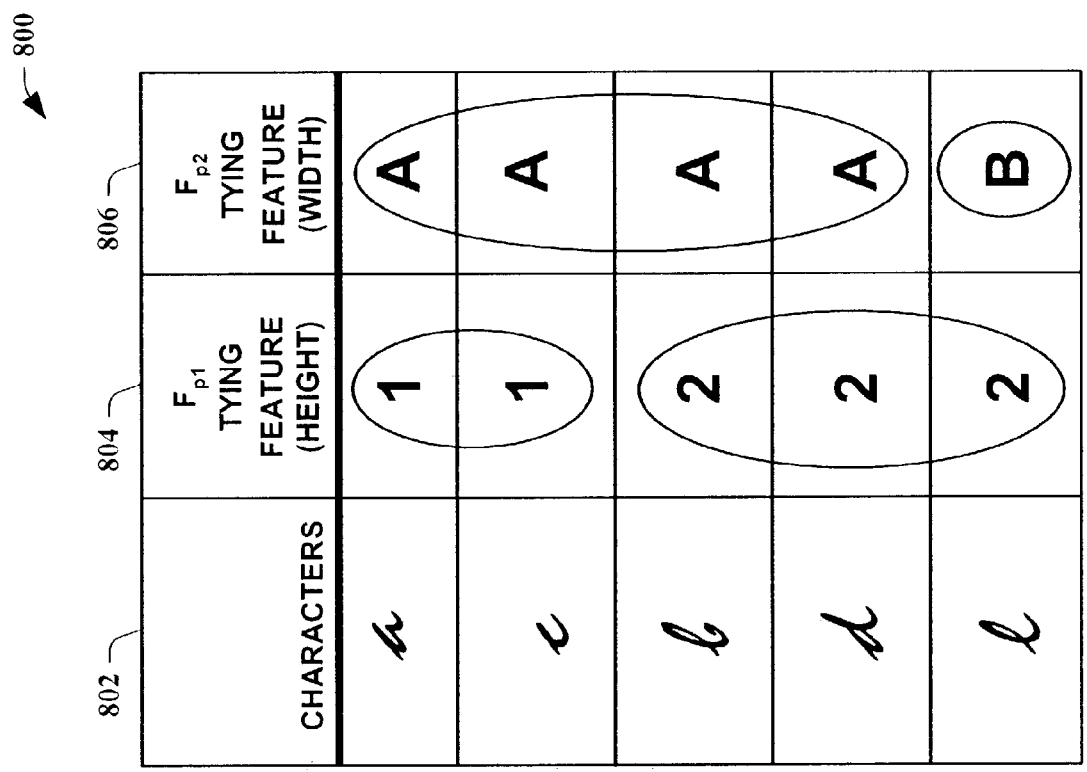
FIG. 8 is an example of tying sets for a group of characters in accordance with an aspect of the present invention.

To further illustrate tying sets, FIG. 8 is an example 800 of tying sets for a group of characters in accordance with an aspect of the present invention. The example 800 is composed of a characters column 802, an $F_{p1}$ tying feature (height) column 804, and an $F_{p2}$ tying feature (width) column 806. This example 800 shows handwriting sample characters "a", "c", "b", "d", and "1" in the characters column 802. The $F_{p1}$ tying feature (height) column 804 represents like tying sets with like numbers. Thus, any row with a number "1" indicates it has a like sub-feature with any other row with a number "1" in the same $F_{p1}$ tying feature (height) column 804. From the $F_{p1}$ height feature column 804, it is apparent that "a" and "c" are in a tying set "1" and "b", "d", and "1" are in a tying set "2." This indicates that, for a sub-feature of character height, "a" and "c" have substantially similar height characteristics, while "b", "d", and "1" have substantially similar height characteristics. Therefore, an enrollment sample that included only a "b" can be utilized to provide the height sub-feature characteristic of "d" and "1" also, reducing the required enrollment data for that sub-feature. The same holds true for the height sub-feature for "a" and "c." Either of these characters can be utilized to construct the height sub-feature of the other.

A similar process can be applied to the $F_{p2}$ tying feature (width) column 806. Here, like members of a tying set are indicated by a capital letter "A" or a capital letter "B." From this, it can be ascertained that characters "a", "c", "b", and "d" have substantially similar width characteristics and collectively represent tying set "A," while character "1" has a unique character width, and, therefore, is the only character in a tying set "B." Once again, enrollment data for this specific user needs to only include examples of one character in a tying set to construct a width for any character in the same tying set, reducing required enrollment data.

The efficiency of the present invention also depends on some classes/characters being similar (or "confusable") for generic features while distinguishable for user-specific features. As an example, a "c" and a "C" look substantially similar for scaled shape features but are substantially distinguishable for size and position features for a specific user. For such classes/characters "confusion rules" are defined. A confusion rule associates a class/character with a set of classes/characters that are confusable for a generic classifier. Examples of confusion rules are, c-{C}, C-{c} and 9-{q, g} with the following meaning, respectively: If identified as a 'c' by a generic classifier, it can possibly be a "C." If identified as a "C," it can possibly be a "c." And, if identified as a "9," it could possibly be a "q," or it could possibly be a "g." A class/character should, at most, appear only once in a left side portion of a set of confusion rules.

Figure 9:
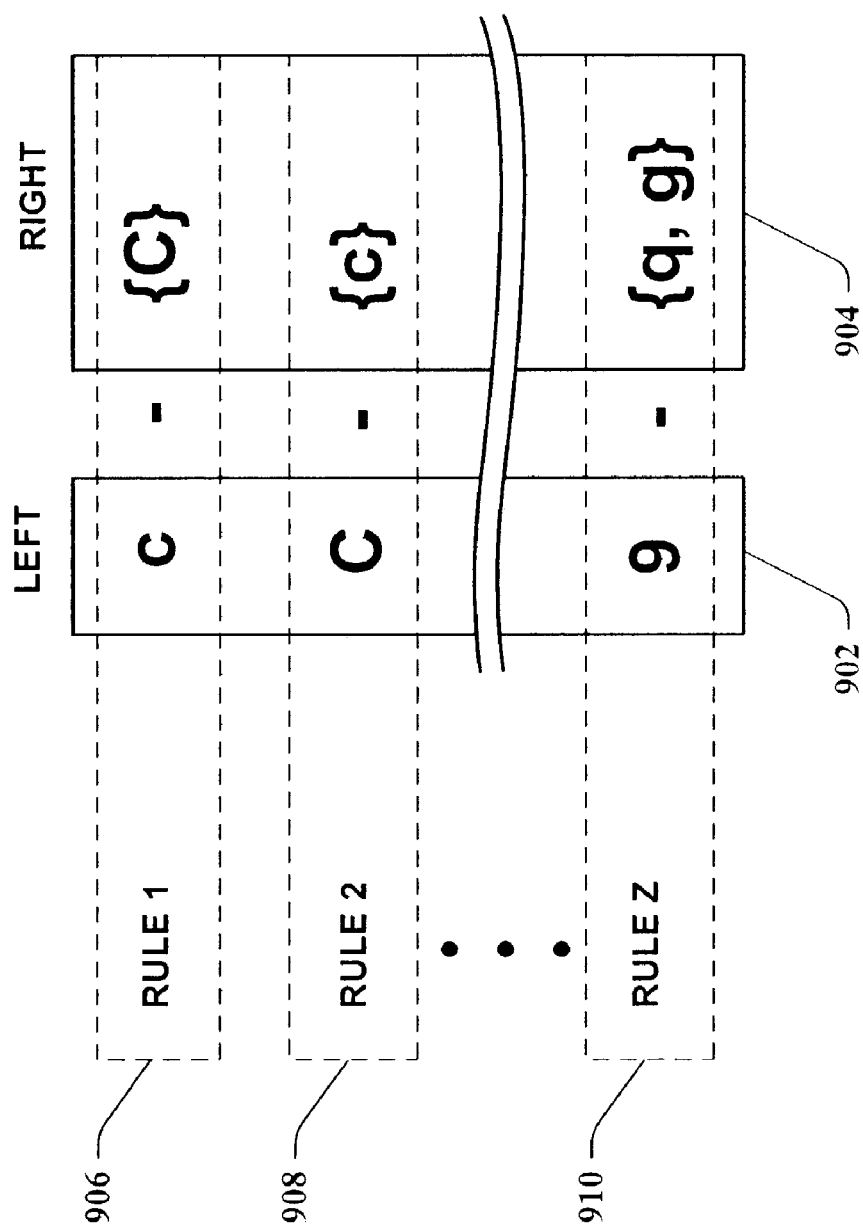
FIG. 9 is an illustration of confusion rules in accordance with an aspect of the present invention.

Referring to FIG. 9, an illustration of confusion rules 900 in accordance with an aspect of the present invention is shown for the above example. A set of rules 906–910 is shown which comprise a left side portion 902 and a right side portion 904 of various confusion rules. The left side portion 902 typically indicates characters that can be confused by a generic classifier. The right side portion 904 typically indicates characters that are substantially similar to the confusing character from the left side portion 902. The number of rules in a set of rules can be any number as indicated by Rule "Z," where Z represents any integer from one to infinity. Rule "Z," as an example, also illustrates that a generic classifier can be confused when a user writes a "9." Rule "Z" states that the "9" could also likely be a "q" or a "g." Likewise, rules "1" 906 and "2" 908 state rules to follow when "c" and "C" are encountered, respectively, as described supra.

In the present invention, a small two-way classifier for each rule is constructed to determine if a character is on the left or right side portion of a rule. If a generic classifier makes a classification that appears on the left side portion of a rule, then the small user specific two-way classifier intervenes and determines if a classification is correct, or if it could be a character on the right side portion of the rule. If this classification turns out as a right side portion, there can be two possibilities. If the right side portion of the rule consists of only one class/character, the original classification is overruled as this class/character, and if the right side portion of the rule consists of multiple classes/characters, the original generic classifier is allowed to determine the correct character among these possibilities.

Figure 10:
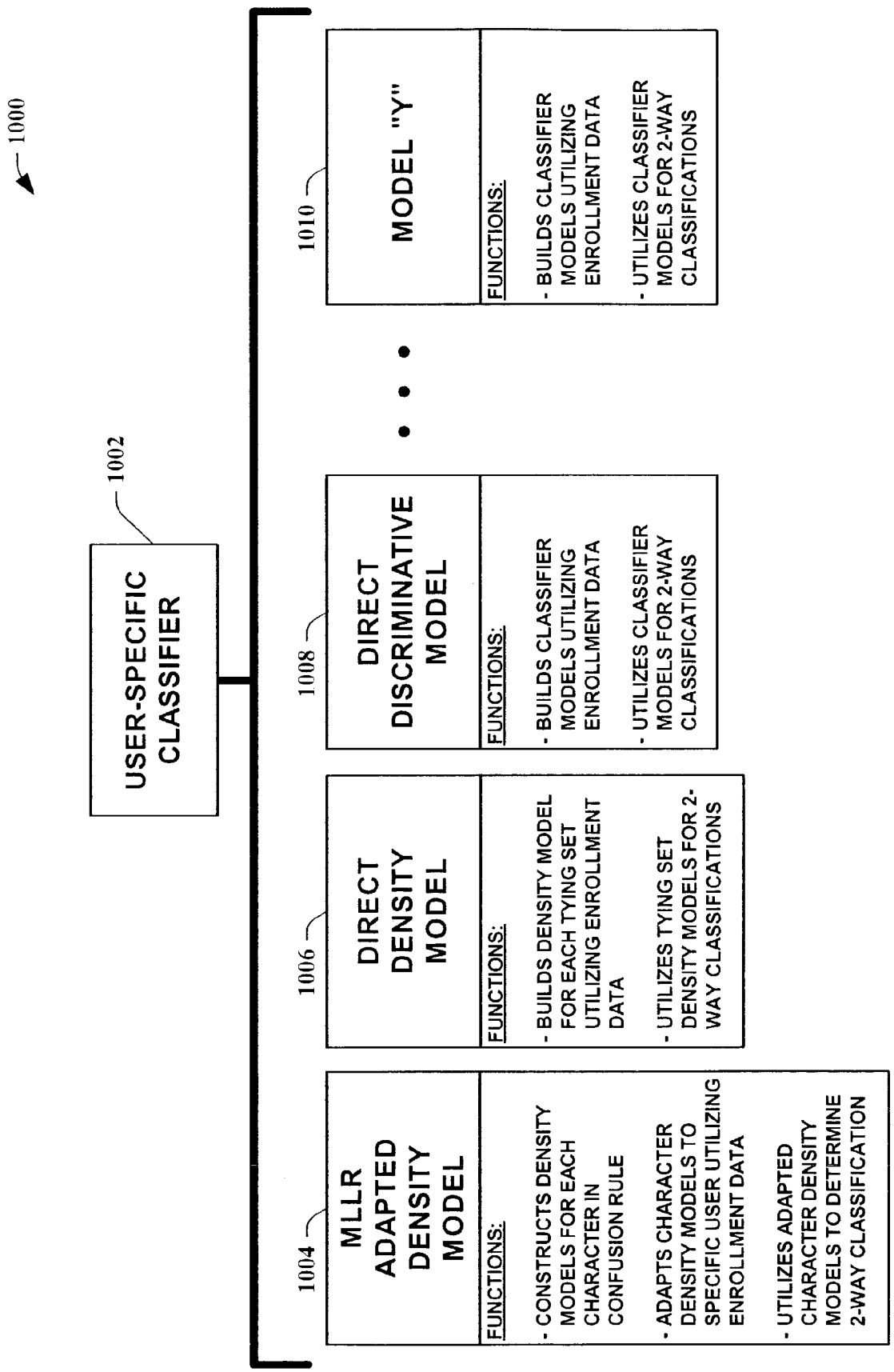
FIG. 10 is a block diagram of examples of user-specific classifiers in accordance with an aspect of the present invention.

Turning to FIG. 10, a block diagram of an example 1000 of user-specific classifiers in accordance with an aspect of the present invention is depicted. Different types of enrollment models can be employed in the present invention as small post-processor classifiers or "two-way" classifiers to facilitate classification of a handwriting recognition system. In this instance of the present invention, the example 1000 is comprised of a user-specific classifier component 1002 and various models for classifying data comprising an MLLR adapted model 1004, a direct density model 1006, a direct discriminative model 1008, and a model "Y" 1010, where Y represents any model that can be utilized to provide functionality desired for the user-specific classifier component 1002. The MLLR adapted density model 1004 provides functionality to construct density models for each character of a confusion rule, adapt the character density models to a specific user utilizing enrollment data, and employ the adapted models to determine a two-way classification. These density models are constructed for features in an $F_{pi}$ associated with a rule and are typically mixtures of Gaussians with diagonal and/or full covariance matrices. Maximum likelihood linear regression methods can be utilized for this function as described in Leggetter & Woodland (1994); *Speaker Adaptation of HMMs Using Linear Regression*; Research Report; Cambridge University Engineering Department and Gales & Woodland (1996); *Mean and Variance Adaptation within the MLLR Framework*; Research Report; Cambridge University Engineering Department to adapt these models to a specific user based on data obtained through a short enrollment period for that user.

The amount of data needed is small due to the implementation of tying sets. The adapted models are then utilized to determine a two-way classification for a confusion rule. If a density of an example is larger for a left side portion of a confusion rule than for a right side portion of the confusion rule, then it is a left side portion classification. Otherwise, it is a right side portion classification. In another instance of the present invention, a likelihood for the adapted user-specific models can be combined with generic models via, for example, a multiplication process.

The direct density model 1006 provides functionality to build a density model for each tying set of a set of user-specific sub-features, $F_{pi}$, and utilizes the tying set density models to determine a two-way classification for a confusion rule. A density model is constructed for each tying set using enrollment data for all characters tied together. The individual density models are built for features for which a tying set is defined. These models are then utilized for the two-way classifications. For a user-specific feature set, $F_{pi}$ associated with a rule, a class/character on a left side portion of a confusion rule should not be in the same tying set as classes/characters on a right side portion of the confusion rule. In another instance of the present invention, a likelihood for the models can be combined with generic models via, for example, a multiplication process.

The direct discriminative model 1008 provides classifier models utilizing observed enrollment data and creates classifier models to determine a two-way classification for a confusion rule. Classifiers are built utilizing enrollment data where data for classes/characters are tied according to the finest partition of tying sets for different user-specific features. See FIG. 7, lines 708–712. The tying sets and confusion rules should be constructed in such a way that this ensures that a class/character on a left side portion of a confusion rule is not in the same tying set as classes/characters on a right side portion of the confusion rule. These models are then used for post-processor classifications.

Similarly, a model "Y" 1010 represents additional models that can provide functionality for building classifiers utilizing enrollment data and constructing classifier models to determine a two-way classification. "Y" represents any number of models from one to infinity that is capable of providing the required functionality.

Figure 11:
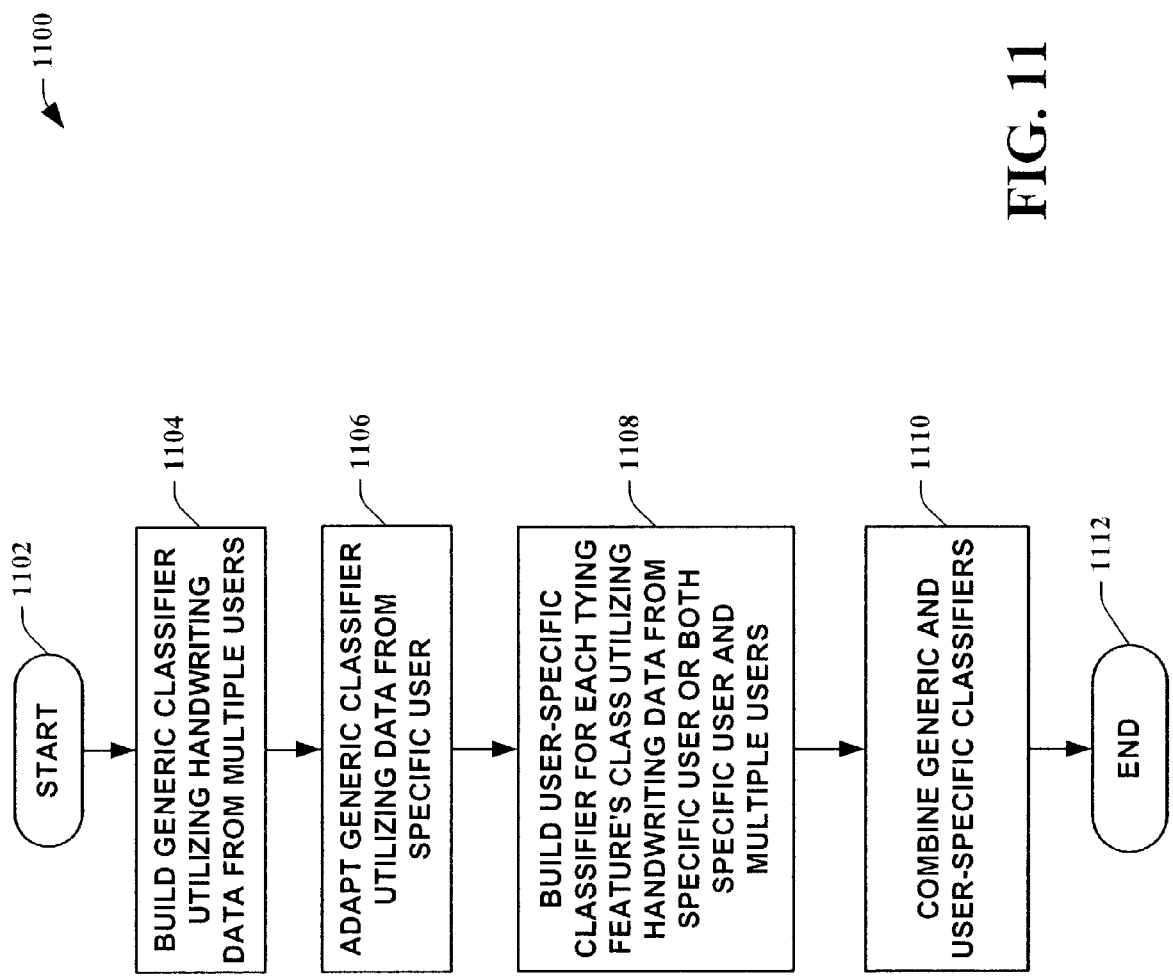
FIG. 11 is a flow diagram of a method of constructing a handwriting recognition system in accordance with an aspect of the present invention.
Figure 12:
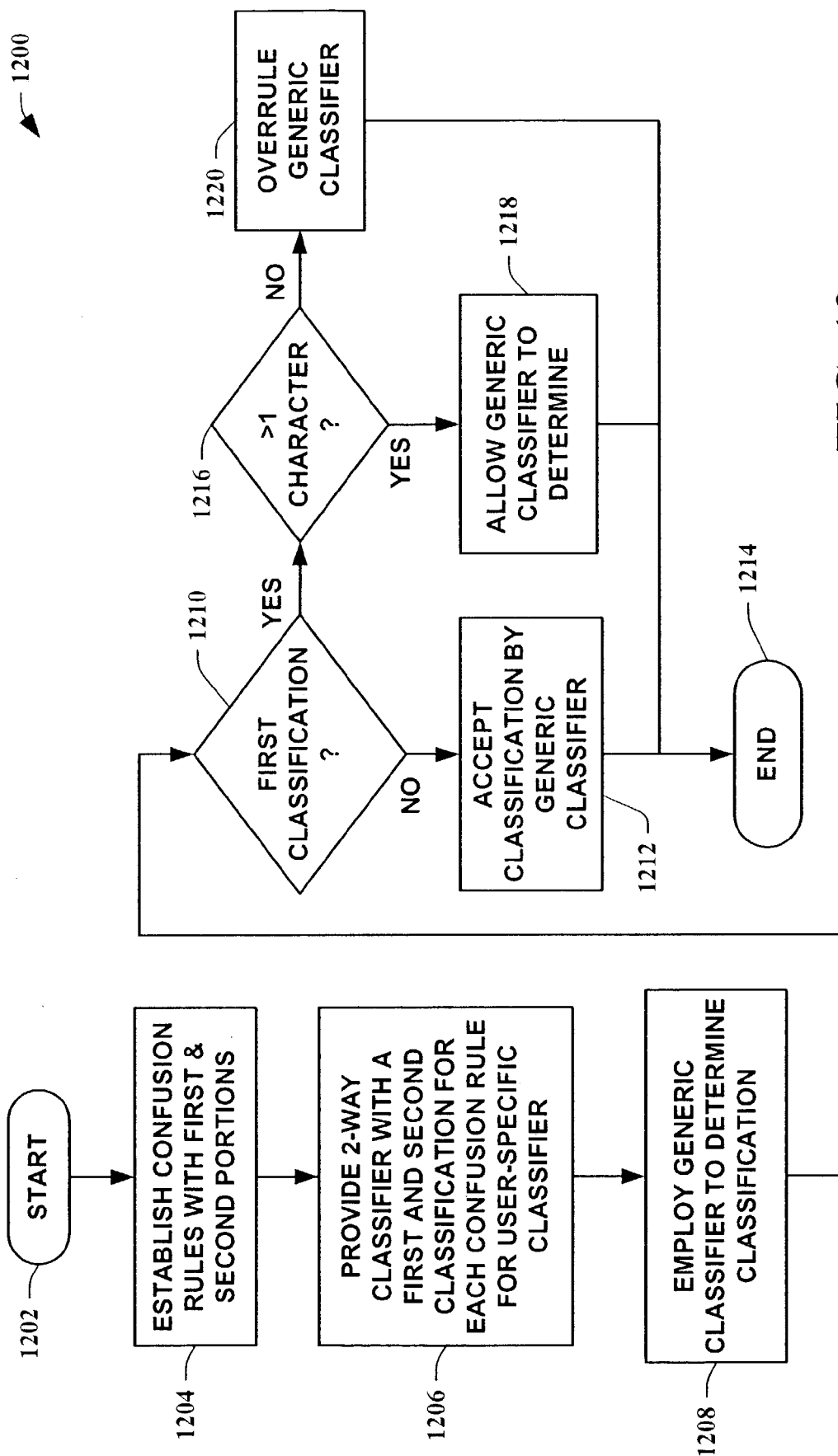
FIG. 12 is a flow diagram of a method of employing a handwriting recognition system in accordance with an aspect of the present invention.
Figure 13:
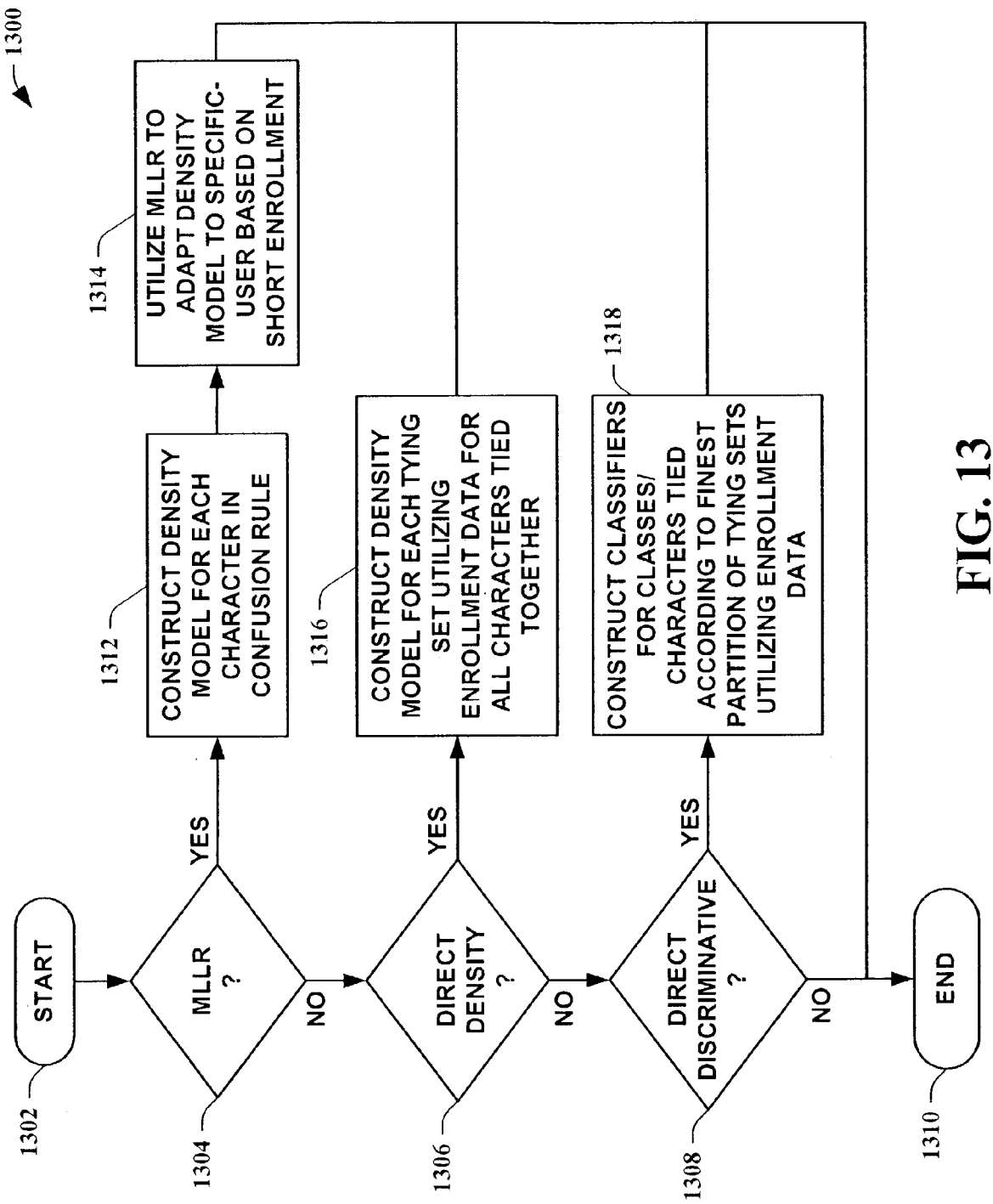
FIG. 13 is a flow diagram of methods of classifying user-specific data in accordance with an aspect of the present invention.

In view of the exemplary systems shown and described above, methodologies that may be implemented in accordance with the present invention will be better appreciated with reference to the flow charts of FIGS. 11–13. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

In FIG. 11, a flow diagram of a method 1100 of constructing a handwriting recognition system in accordance with an aspect of the present invention is shown. The method 1100 starts 1102 by building at least one generic classifier utilizing handwriting data from multiple users 1104. The data utilized by the generic classifier can include generic features and/or user-specific features. The generic classifier is typically utilized as a first processor for classifying handwriting data. In other instances of the present invention, this function is provided by an existing system. The generic classifier can then be adapted utilizing data from a specific user 1106. In other instances of the present invention, adapting the generic classifier in this manner is optional. A user-specific classifier is then constructed for each tying feature's class utilizing handwriting data from a specific user or both a specific user and multiple users 1108. The generic and user-specific classifiers are then combined 1110, ending the flow 1112. In one instance of the present invention, for example, the combined classifiers are employed as follows. If a generic classifier makes a classification that appears on the a left side portion of a rule, then a user-specific classifier intervenes and determines if a classification is correct, or if it could be a character on a right side portion of the rule. If this classification turns out as a right side portion, there can be two possibilities. If the right side portion of the rule consists of only one class/character, the original classification is overruled as this class/character, and if the right side portion of the rule consists of multiple classes/characters, the original generic classifier is allowed to determine the correct character among these possibilities.

Moving on to FIG. 12, a flow diagram of a method 1200 of employing a handwriting recognition system in accordance with an aspect of the present invention is depicted. The method 1200 starts 1202 by establishing confusion rules having first and second portions 1204. The confusion rules give guidance regarding classifications of classes/characters that fall within the confusion rule. A two-way classifier with a first and second classification is then provided for each confusion rule 1206. This allows a user-specific classifier to further facilitate class/character classifications when a generic classifier is confused. A generic classifier is then employed to determine a classification of a handwriting sample 1208. A determination is then made as to whether the classification falls within the first classification 1210. The first classification typically represents the first portion (e.g., "left side portion") of a confusion rule. If not, the classification by the generic classifier is accepted 1212, ending the flow 1214. If, however, the determination finds that it is in the first classification 1210, a determination is made as to whether the second portion (e.g., "right side portion") of a confusion rule contains more than one character 1216. If the right side portion of the rule consists of only one class/character, the original classification is overruled as this class/character 1220, ending the flow 1214. However, if the right side portion of the rule consists of multiple classes/characters, the original generic classifier is allowed to determine the correct character among these possibilities 1218, ending the flow 1214.

Looking at FIG. 13, a flow diagram of constructing methods 1300 for classifying user-specific data in accordance with an aspect of the present invention is illustrated. The present invention can employ any method that provides a two-way classifier to support confusion rules. FIG. 13 illustrates some examples employable by the present invention. The methods 1300 start 1302 with a determination as to whether an MLLR based method is being employed 1304. If yes, a density model is constructed based on multiple user training data for each character that appears in a confusion rule 1312. These density models are constructed for features in an $F_{pi}$ associated rule and are typically mixtures of Gaussians with diagonal or full covariance matrices. A maximum likelihood linear regression (MLLR) method such as those described in Leggetter & Woodland (1994) and Gales & Woodland (1996), id, is then utilized to adapt the density models to a specific user based on data obtained through a short enrollment period for that user 1314, ending the flow 1310. The amount of data required is small due to utilizing tying sets. The adapted density models are then employable as a two-way classifier for confusion rules. If, however, MLLR is not being employed 1304, a determination is made as to whether a direct density model is being utilized 1306. If yes, a density model is constructed for each tying set utilizing enrollment data for all characters tied together 1316, ending the flow 1310. For a user-specific feature set $F_{pi}$ associated with a rule, a class/character on a left side portion of a confusion rule should not be in the same tying set as classes/characters on a right side portion of the confusion rule. This density model is then employed as a two-way classifier for a confusion rule. If, however, a direct density model is not being employed 1306, a determination is made as to whether a direct discriminative model is being employed 1308. If yes, classifiers are constructed utilizing enrollment data where data for classes/characters are tied according to the finest partition of tying sets for different user-specific features 1318, ending the flow 1310. Generally speaking, the tying sets and the confusion rules should be constructed so that classes/characters on a left side portion of a confusion rule are not in the same tying set as classes/characters on a right side portion of the confusion rule. This model is then employed as a two-way classifier for a confusion rule. If, however, a direct discriminative model is not being employed 1308, the flow ends 1310. The ending of the flow 1310 is not meant to preclude additional models from being utilized by the present invention. It only represents the end of the possibilities of the three modeling methods discussed for this example of this instance of the present invention as stated above.

Figure 14:
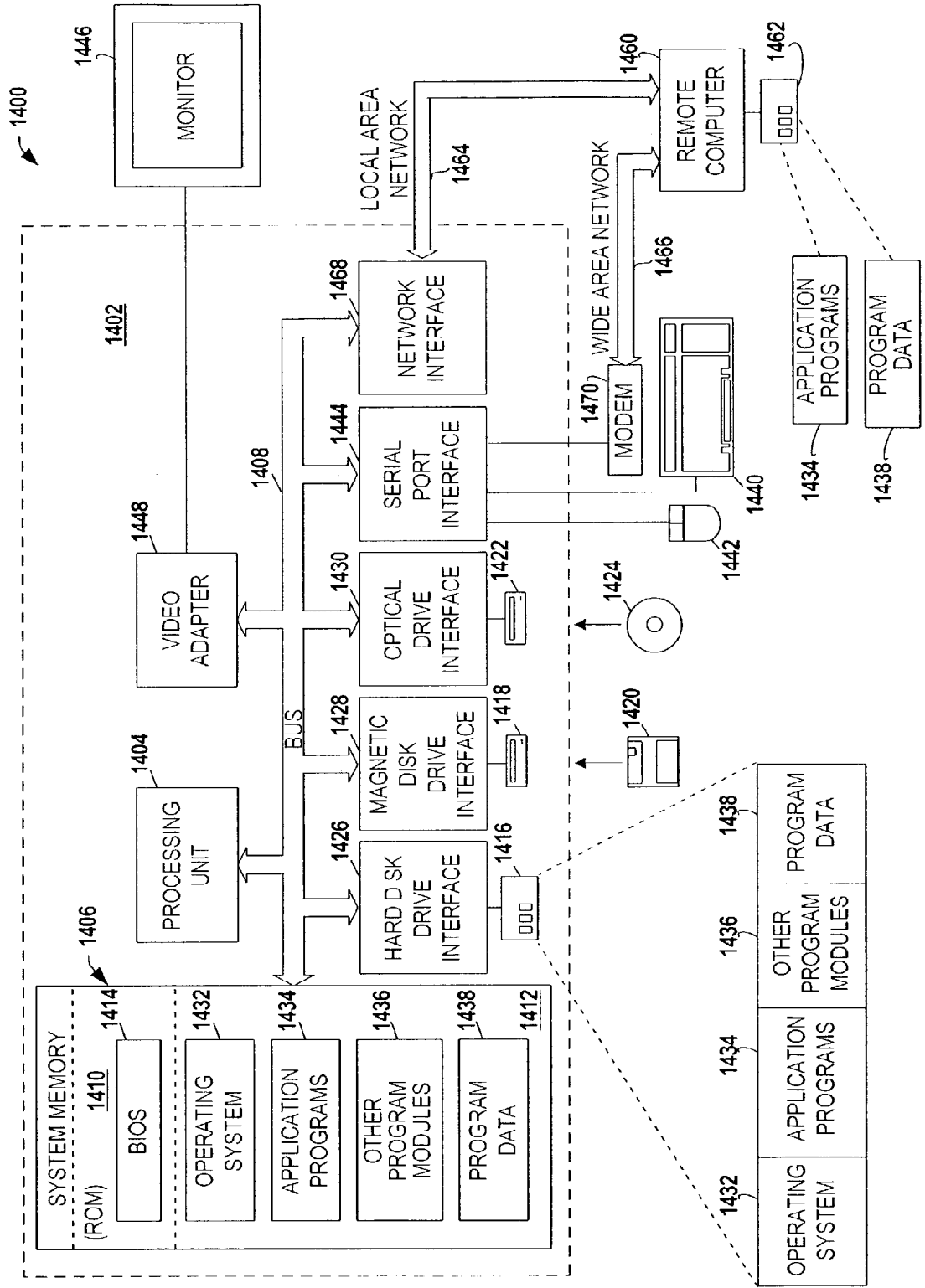
FIG. 14 illustrates an example operating environment in which the present invention can function.

In order to provide additional context for implementing various aspects of the present invention, FIG. 14 and the following discussion is intended to provide a brief, general description of a suitable computing environment 1400 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 14, an exemplary system environment 1400 for implementing the various aspects of the invention includes a conventional computer 1402, including a processing unit 1404, a system memory 1406, and a system bus 1408 that couples various system components, including the system memory, to the processing unit 1404. The processing unit 1404 may be any commercially available or proprietary processor. In addition, the processing unit may be implemented as multi-processor formed of more than one processor, such as may be connected in parallel.

The system bus 1408 may be any of several types of bus structure including a memory bus or memory controller, a peripheral bus, and a local bus using any of a variety of conventional bus architectures such as PCI, VESA, Microchannel, ISA, and EISA, to name a few. The system memory 1406 includes read only memory (ROM) 1410 and random access memory (RAM) 1412. A basic input/output system (BIOS) 1414, containing the basic routines that help to transfer information between elements within the computer 1402, such as during start-up, is stored in ROM 1410.

The computer 1402 also may include, for example, a hard disk drive 1416, a magnetic disk drive 1418, e.g., to read from or write to a removable disk 1420, and an optical disk drive 1422, e.g, for reading from or writing to a CD-ROM disk 1424 or other optical media. The hard disk drive 1416, magnetic disk drive 1418, and optical disk drive 1422 are connected to the system bus 1408 by a hard disk drive interface 1426, a magnetic disk drive interface 1428, and an optical drive interface 1430, respectively. The drives 1416-1422 and their associated computer-readable media provide nonvolatile storage of data, data structures, computer-executable instructions, etc. for the computer 1402. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1400, and further that any such media may contain computer-executable instructions for performing the methods of the present invention.

A number of program modules may be stored in the drives 1416–1422 and RAM 1412, including an operating system 1432, one or more application programs 1434, other program modules 1436, and program data 1438. The operating system 1432 may be any suitable operating system or combination of operating systems. By way of example, the application programs 1434 can include an adaptive handwriting recognition system in accordance with an aspect of the present invention.

A user can enter commands and information into the computer 1402 through one or more user input devices, such as a keyboard 1440 and a pointing device (e.g., a mouse 1442). Other input devices (not shown) may include a microphone, a joystick, a game pad, a satellite dish, wireless remote, a scanner, or the like. These and other input devices are often connected to the processing unit 1404 through a serial port interface 1444 that is coupled to the system bus 1408, but may be connected by other interfaces, such as a parallel port, a game port or a universal serial bus (USB). A monitor 1446 or other type of display device is also connected to the system bus 1408 via an interface, such as a video adapter 1448. In addition to the monitor 1446, the computer 1402 may include other peripheral output devices (not shown), such as speakers, printers, etc.

It is to be appreciated that the computer 1402 can operate in a networked environment using logical connections to one or more remote computers 1460. The remote computer 1460 may be a workstation, a server computer, a router, a peer device or other common network node, and typically includes many or all of the elements described relative to the computer 1402, although, for purposes of brevity, only a memory storage device 1462 is illustrated in FIG. 14. The logical connections depicted in FIG. 14 can include a local area network (LAN) 1464 and a wide area network (WAN) 1466. Such networking environments are commonplace in offices, enterprise-wide computer networks, intranets and the Internet.

When used in a LAN networking environment, for example, the computer 1402 is connected to the local network 1464 through a network interface or adapter 1468. When used in a WAN networking environment, the computer 1402 typically includes a modem (e.g., telephone, DSL, cable, etc.) 1470, or is connected to a communications server on the LAN, or has other means for establishing communications over the WAN 1466, such as the Internet. The modem 1470, which can be internal or external relative to the computer 1402, is connected to the system bus 1408 via the serial port interface 1444. In a networked environment, program modules (including application programs 1434) and/or program data 1438 can be stored in the remote memory storage device 1462. It will be appreciated that the network connections shown are exemplary and other means (e.g., wired or wireless) of establishing a communications link between the computers 1402 and 1460 can be used when carrying out an aspect of the present invention.

In accordance with the practices of persons skilled in the art of computer programming, the present invention has been described with reference to acts and symbolic representations of operations that are performed by a computer, such as the computer 1402 or remote computer 1460, unless otherwise indicated. Such acts and operations are sometimes referred to as being computer-executed. It will be appreciated that the acts and symbolically represented operations include the manipulation by the processing unit 1404 of electrical signals representing data bits which causes a resulting transformation or reduction of the electrical signal representation, and the maintenance of data bits at memory locations in the memory system (including the system memory 1406, hard drive 1416, floppy disks 1420, CD-ROM 1424, and remote memory 1462) to thereby reconfigure or otherwise alter the computer system's operation, as well as other processing of signals. The memory locations where such data bits are maintained are physical locations that have particular electrical, magnetic, or optical properties corresponding to the data bits.

Figure 15:
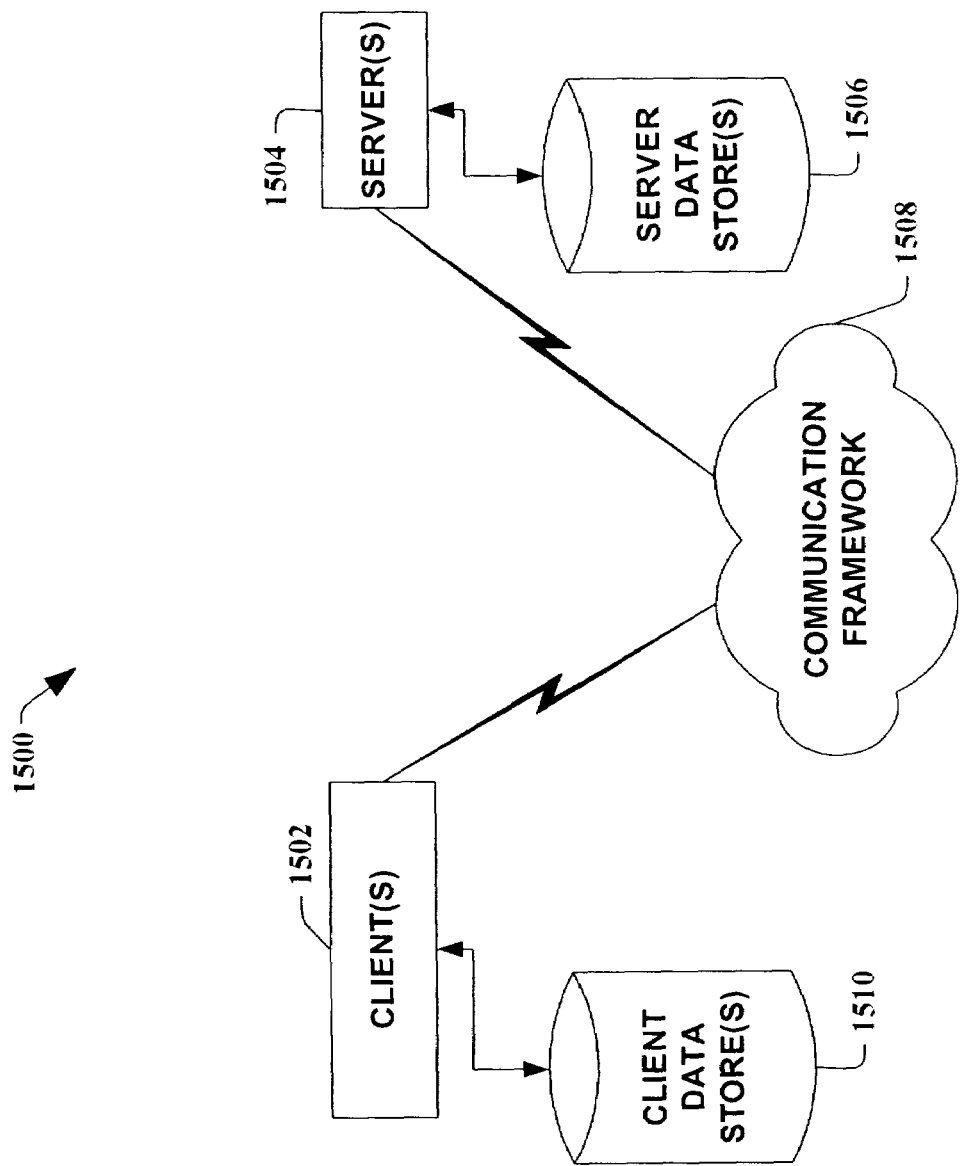
FIG. 15 illustrates another example operating environment in which the present invention can function.

FIG. 15 is another block diagram of a sample computing environment 1500 with which the present invention can interact. The system 1500 further illustrates a system that includes one or more client(s) 1502. The client(s) 1502 can be hardware and/or software (e.g., threads, processes, computing devices). The system 1500 also includes one or more server(s) 1504. The server(s) 1504 can also be hardware and/or software (e.g., threads, processes, computing devices). The servers 1504 can house threads to perform transformations by employing the present invention, for example. One possible communication between a client 1502 and a server 1504 may be in the form of a data packet adapted to be transmitted between two or more computer processes. The system 1500 includes a communication framework 1508 that can be employed to facilitate communications between the client(s) 1502 and the server(s) 1504. The client(s) 1502 are operably connected to one or more client data store(s) 1510 that can be employed to store information local to the client(s) 1502. Similarly, the server(s) 1504 are operably connected to one or more server data store(s) 1506 that can be employed to store information local to the servers 1504.

In one instance of the present invention, a data packet is transmitted between two or more computer components that facilitates handwriting recognition with the data packet comprised of, at least in part, handwriting related information from a handwriting recognition system that utilizes a generic classifier and a user-specific classifier in conjunction to classify handwriting data.

In another instance of the present invention, a computer readable medium storing computer executable components of a system for facilitating handwriting recognition is comprised of a handwriting recognition system that is comprised of, at least in part, a generic classifier and a user-specific classifier that are operable in conjunction with each other to classify handwriting data.

It is to be appreciated that the apparatus, systems and/or methods of the present invention can be utilized in a handwriting recognition scheme for facilitating computer components and non-computer related components alike. Further, those skilled in the art will recognize that the systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates adaptive handwriting recognition, comprising:
   a component that receives handwriting data; and
   a recognition component that analyzes the handwriting data in connection with recognition thereof, the recognition component employing at least one generic classifier and at least one user-specific classifier in connection with the analysis, at least one confusion rule is established for the at least one generic classifier, each confusion rule having at least a first portion and a second portion; the at least one user-specific classifier is utilized to further refine the classification of the data by the at least one generic classifier, the number of characters in the second portion of the confusion rule is determined when utilizing the at least one user-specific classifier; the at least one generic classifier is overruled when only one character is in the second portion of the confusion rule.

2. The system of claim 1, at least one generic classifier applied against generic features of the handwriting data that exhibit substantial commonality across a plurality of users.

3. The system of claim 2, the generic features including, at least in part, at least one selected from the group consisting of scaled shape features, size features, and position features.

4. The system of claim 1, at least one user-specific classifier applied against specific features of the handwriting data that exhibit substantial uniqueness to a particular user.

5. The system of claim 4, the specific features including, at least in part, at least one selected from the group consisting of size features and position features.

6. The system of claim 1, further comprising a plurality of user specific classifiers, each of the respective user-specific classifiers being associated with respective sets of features.

7. The system of claim 6, the sets of features being disjoint.

8. The system of claim 1, the confusion rules associate a class/character with a set of classes/characters that can be confusable for the at least one generic classifier.

9. The system of claim 7, employing density models constructed for respective characters of a confusion rule.

10. The system of claim 9, at least one density model comprising an MLLR adapted density model.

11. The system of claim 7, employing a direct discriminative model constructed for respective characters of a confusion rule.

12. The system of claim 1, the generic classifier being an adapted version of an initially supplied generic classifier.

13. A method for building a handwriting recognition system, comprising:
building at least one generic classifier utilizing handwriting data associated with a plurality of users;
establishing at least one confusion rule for the generic classifier, each confusion rule having at least a first portion and a second portion;
building at least one user specific classifier utilizing handwriting data supplied by at least one selected from the group consisting of a specific user and both a specific user and a plurality of users;
determining the number of characters in the second portion of the confusion rule when utilizing the user-specific classifier; and
overruling the generic classifier when only one character is in the second portion of the confusion rule.

14. The method of claim 13, further comprising employing a generic classification model and at least one tying class having at least one tying set to train at least one user-specific classifier.

15. The method of claim 14, wherein data associated with at least one tying set for at least one tying class is utilized to adapt a set of models using MLLR.

16. The method of claim 14, wherein data associated with at least one tying set for at least one tying class is utilized to build a set of direct density models.

17. The method of claim 14, wherein data associated with at least one tying set for at least one tying class is utilized to build a direct discriminative model.

18. The method of claim 17, wherein the direct discriminative model is based on classifiers with class/character data tied to at least one finest grained partition of at least one tying set for at least one user-specific feature.

19. A system for recognizing handwriting, comprising:
means for generically determining a classification of handwriting information trained via data from multiple users and at least one generic classifier confusion rule, each confusion rule having at least a first portion and a second portion;
means for specifically determining a classification of handwriting information trained, at least in part, via data from a specific user;
means for operably utilizing both the generically determining means and the specifically determining means to classify handwriting data;
means for determining the number of characters in the second portion of the confusion rule when utilizing the user-specific classifier; and
means for overruling the generic classifier when only one character is in the second portion of the confusion rule.

20. The system of claim 19, further including:
means for classifying handwriting data for at least one generic classifier confusion rule.

21. The system of claim 20, further including:
means for overruling at least one generic classification based upon at least one confusion rule.

22. A method for recognizing handwriting, comprising:
processing handwriting data utilizing at least one generic classifier to establish at least one classification of the data;
establishing at least one confusion rule for the generic classifier, each confusion rule having at least a first portion and a second portion;
utilizing at least one user-specific classifier to further refine the classification of the data by the generic classifier;
determining the number of characters in the second portion of the confusion rule when utilizing the user-specific classifier; and
overruling the generic classifier when only one character is in the second portion of the confusion rule.

23. The method of claim 22, further comprising:
building at least a two-way classifier for each of the confusion rules for utilization by at least one user-specific classifier, the two-way classifier comprising at least a first classification representing at least the first portion of the confusion rule and at least a second classification representing at least the second portion of the confusion rule.

24. The method of claim 23, the two-way classifier comprising, at least in part, at least one selected from the group consisting of an MLLR adapted density model, a direct density model, and a direct discriminative model.

25. The method of claim 23, the two-way classifier comprising models developed via a combination of likelihood from at least one adapted user-specific model and at least one generic model.

26. The method of claim 25, the combination comprising results from a multiplication process of likelihood from the adapted user-specific model and the generic model.

27. The method of claim 23, further comprising:
employing the generic classifier to determine when data is in the first classification;
utilizing the user-specific classifier to further refine data when the generic classifier determines data to be in the first classification; and accepting the determination of the generic classifier when data is classified in a classification other than the first classification.

28. The method of claim 27, further comprising:
classifying the character via the generic classifier among characters in the second portion of the confusion rule when more than one character is in the second portion of the confusion rule.

29. A computer readable medium having stored thereon computer executable components of the system of claim 1.

30. A device employing the method of claim 22 comprising at least one selected from the group consisting of a computer, a server, and a handheld electronic device.

31. A device employing the system of claim 1 comprising at least one selected from the group consisting of a computer, a server, and a handheld electronic device.

32. A computer readable medium having stored thereon computer executable instructions for performing the method of claim 22.

* * * * *